(12) United States Patent
Tian et al.

(10) Patent No.: US 12,397,258 B2
(45) Date of Patent: Aug. 26, 2025

(54) TREATMENT DEVICE FOR EXHAUST GAS FROM RARE EARTH CALCINATION

(71) Applicant: BAOTOU RESEARCH INSTITUTE OF RARE EARTHS, Baotou (CN)

(72) Inventors: Hao Tian, Baotou (CN); Jincheng Guo, Baotou (CN); Shaochun Hou, Baotou (CN); Hui Xu, Baotou (CN); Erdou Li, Baotou (CN); Jing Song, Baotou (CN)

(73) Assignee: BAOTOU RESEARCH INSTITUTE OF RARE EARTHS, Baotou (CN)

( * ) Notice: Subject to any disclaimer, the term of this patent is extended or adjusted under 35 U.S.C. 154(b) by 405 days.

(21) Appl. No.: 18/193,895

(22) Filed: Mar. 31, 2023

(65) Prior Publication Data

US 2023/0233981 A1   Jul. 27, 2023

(30) Foreign Application Priority Data

Jan. 5, 2023   (CN) .......................... 202310013110.0

(51) Int. Cl.
*B01D 47/06*   (2006.01)
*B01F 23/21*   (2022.01)
*B01F 23/213*  (2022.01)

(52) U.S. Cl.
CPC ............ *B01D 47/06* (2013.01); *B01F 23/213* (2022.01); *B01F 23/2132* (2022.01); *B01F 23/214* (2022.01); *B01D 2247/04* (2013.01); *B01D 2257/60* (2013.01)

(58) Field of Classification Search
CPC .... B01F 23/21; B01F 23/213; B01F 23/2132; B01F 23/214; B01D 47/06
See application file for complete search history.

(56) References Cited

FOREIGN PATENT DOCUMENTS

| CN | 205517150 U | 8/2016 |
| CN | 208541954 U | 2/2019 |
| CN | 215506204 U | 1/2022 |
| CN | 217188833 U | * 8/2022 |

* cited by examiner

*Primary Examiner* — Robert A Hopkins
(74) *Attorney, Agent, or Firm* — Osha Bergman Watanabe & Burton LLP (57) ABSTRACT

The present disclosure provides a treatment device for an exhaust gas from rare earth calcination, comprising a spray apparatus in which a sprayer is arranged, the sprayer comprising an input pipe, a nozzle, a toothed ring, a rotating impeller, a first gear, and a second gear, wherein the input pipe is configured to input a spray liquid to the nozzle; wherein the nozzle is arranged to be more than one, rotatably connected to the input pipe, arranged in a ring shape. The treatment device enables more uniform contact between the exhaust gas and the spray liquid.

10 Claims, 4 Drawing Sheets

TREATMENT DEVICE FOR EXHAUST GAS FROM RARE EARTH CALCINATION

TECHNICAL FIELD OF THE DISCLOSURE

The present disclosure relates to a treatment device for an exhaust gas from rare earth calcination.

BACKGROUND OF THE DISCLOSURE

Rare earth calcination is the process of thermally decomposing rare earth salts into rare earth oxides at high temperatures. The exhaust gas generated by the thermal decomposition reaction needs to be filtered by means of a bag filter before being discharged, with a view to improving the product yield and reducing the concentration of particulate substances in the flue gas; and be subjected to spray treatment by spray equipment with a view to avoiding heat energy loss caused by the otherwise direct discharge of the high-temperature gas and further purifying the exhaust gas.

CN215506204U discloses a treatment device for an exhaust gas from rare earth calcination. The treatment device comprises an exhaust gas cooling box, a dust filtration box, a spray sorption box, and a neutralization adjustment box. A nozzle capable of rotating transversely is provided in the spray sorption box. A water outlet is provided on the nozzle, and the two ends of the nozzle are connected to a drive motor and a water supply pump, respectively.

CN208541954U discloses a spray tower for an exhaust gas from rare earth processing furnace. The spray tower comprises a spray tower body. A vent is provided on the top of the spray tower body, and a drain pipe is provided on its bottom. Multiple groups of bow-shaped sieve plates are provided respectively on the left and right inner walls of the spray tower that are located between the nozzle and the gas inlet pipe. The bottom of the spray tower is provided with a liquid discharge pipe, and one end of the liquid discharge pipe is connected to a backwash water pump. The feed end of the gas inlet pipe that is located outside the spray tower is bent upwards, and the discharge part of the gas inlet pipe that is located inside the spray tower is obliquely provided with a cut.

CN205517150U discloses a treatment device for an exhaust gas from rare earth metal electrolysis. The treatment device comprises an electrolytic furnace, a spiral nozzle, and a spray head. The exhaust gas outlet of the electrolytic furnace is connected to the gas inlet of the cyclone separator by means of a pipe, and the gas outlet of the cyclone separator is connected to the gas inlet of the sorption tower by means of a pipe. A solid particle collection box is connected to the lower part of the cyclone separator. The spiral nozzle is fixed to the inside of the sorption tower by means of a connector. The spray head is mounted on the spiral nozzle. The right side of the sorption tower is provided with a neutralization liquid tank. The spiral nozzle, the pump body, and the neutralization liquid tank are connected successively by means of a pipe. The upper part of the sorption tower is connected to the discharge pipe, and the bottom part thereof is connected to the waste liquid tank by means of a pipe.

In the devices described above, the exhaust gas cannot come into sufficiently uniform contact with the spray liquid in the spray apparatus, which results in the failure to achieve a good treatment effect.

SUMMARY OF THE DISCLOSURE

In view of the above, the present disclosure is intended to provide a treatment device for an exhaust gas from rare earth calcination that enables more uniform contact between the exhaust gas and a spray liquid and thereby achieves an improved treatment effect. Further, the treatment device can prevent dust in the recycled spray liquid from clogging some apparatus. Furthermore, the treatment device can decrease the amount of dust in the recycled spray liquid. The above objectives are accomplished by technical solutions described below.

The present disclosure provides a treatment device for an exhaust gas from rare earth calcination, comprising a spray apparatus in which a sprayer is arranged;
- the sprayer comprising an input pipe, a nozzle, a toothed ring, a rotating impeller, a first gear, and a second gear;
- wherein the input pipe is configured to input a spray liquid to the nozzle;
- wherein the nozzle is arranged to be more than one, rotatably connected to the input pipe, arranged in a ring shape, and configured to be able to spray the spray liquid into the spray apparatus;
- wherein the first gear is connected to a periphery of the nozzle;
- wherein the toothed ring is arranged below the input pipe and arranged on a periphery of a ring formed by the nozzles; inner-ring teeth that mesh with the first gear are provided on an inner side of the toothed ring; and meshing teeth are provided on a surface of the toothed ring that is away from the input pipe;
- wherein the rotating impeller is arranged below the toothed ring and configured to drive the second gear to rotate; and
- wherein the second gear is connected to the rotating impeller, meshes with the meshing teeth, and is configured to drive the toothed ring to rotate.

According to the treatment device of the present disclosure, it is preferable that a turbulence blade is attached to an outer surface of the nozzle.

According to the treatment device of the present disclosure, it is preferable that the nozzle has a liquid outlet opened downwards, and that the turbulence blade is at least two, and the turbulence blades are dispersedly arranged near the liquid outlet.

According to the treatment device of the present disclosure, it is preferable that the treatment device further comprises a liquid suction assembly that comprises a slide cylinder, a slide rod, and a liquid suction pipe;
- wherein one end of the liquid suction pipe is connected to the input pipe, and the other end of the liquid suction pipe is provided with a liquid inlet; at least a part of the liquid suction pipe is made of a flexible material; and the liquid suction pipe is configured to be able to deliver the spray liquid to the input pipe;
- wherein one end of the slide rod is connected to one end of the liquid suction pipe that is provided with the liquid inlet; and
- wherein the slide cylinder is filled with a thermally expandable material, the slide cylinder is connected to one end of the slide rod that is away from the liquid suction pipe, and the thermally expandable material is configured to be able to control, by a volume change thereof, stretching out and drawing back of the slide rod.

According to the treatment device of the present disclosure, it is preferable that the liquid suction pipe is provided with a water pump.

According to the treatment device of the present disclosure, it is preferable that a lower part of the spray apparatus is provided with an exhaust gas inlet that is configured to enable the exhaust gas to be treated to enter the spray apparatus;

wherein a top part of the spray apparatus is provided with an exhaust gas outlet that is configured to enable the exhaust gas that has come into contact with the spray liquid to be discharged from the spray apparatus; and wherein a bottom part of the spray apparatus is provided with a spray liquid outlet that is configured to enable the spray liquid that has come into contact with the exhaust gas to be discharged from the spray apparatus.

According to the treatment device of the present disclosure, it is preferable that the treatment device further comprises a liquid storage apparatus;

wherein the liquid storage apparatus is arranged below the spray apparatus and the liquid storage apparatus is provided with an opening on its top, the slide cylinder is fixed in the liquid storage apparatus, and the liquid storage apparatus is configured to be able to store the spray liquid.

According to the treatment device of the present disclosure, it is preferable that the treatment device further comprises a dust removal assembly that comprises a first transmission shaft, a second transmission shaft, and a dust removal fabric;

wherein the first transmission shaft is arranged above an edge A of the opening of the liquid storage apparatus;

wherein the second transmission shaft is arranged above an edge B of the opening of the liquid storage apparatus, the edge A and the edge B facing each other;

wherein the first transmission shaft and the second transmission shaft are configured to be able to support the dust removal fabric and drive the dust removal fabric to move;

wherein the dust removal fabric comprises a first part, a second part, a third part, and a fourth part that are sequentially connected;

the first part covering at least a part of the first transmission shaft;

the second part covering at least a part of an inner surface of a side wall of the liquid storage apparatus that is close to the first transmission shaft, at least a part of an inner surface of the bottom of the liquid storage apparatus, and at least a part of an inner surface of a side wall of the liquid storage apparatus that is close to the second transmission shaft;

the third part covering at least a part of the second transmission shaft; and the fourth part covering at least a part of an outer surface of a side wall of the liquid storage apparatus that is close to the first transmission shaft, at least a part of an outer surface of the bottom of the liquid storage apparatus, and at least a part of an outer surface of a side wall of the liquid storage apparatus that is close to the second transmission shaft; and wherein the dust removal fabric is configured to be able to remove dust in the spray liquid in the liquid storage apparatus.

According to the treatment device of the present disclosure, it is preferable that the dust removal assembly further comprises a wiping roller and a drive motor;

wherein the wiping roller is arranged on the bottom of the liquid storage apparatus and comes into contact with a surface of the dust removal fabric that is away from the liquid storage apparatus, and the wiping roller is configured to be able to remove dust on the dust removal fabric; and wherein the drive motor is connected to the first transmission shaft, and connected to the wiping roller by means of a transmission member.

According to the treatment device of the present disclosure, it is preferable that a surface of the dust removal fabric that is away from the liquid storage apparatus is provided with a flexible protrusion that is configured to be able to intercept dust in the spray liquid.

The treatment device of the present disclosure enables more uniform contact between an exhaust gas and the spray liquid. Further, the treatment device can prevent dust in the recycled spray liquid from clogging the apparatus. Furthermore, the treatment device can decrease the amount of dust in the recycled spray liquid.

The reference numerals are detailed as follows:

1—spray apparatus; 11—exhaust gas inlet; 12—exhaust gas outlet; 13—spray liquid outlet; 14—sprayer; 141—input pipe; 142—nozzle; 1421—turbulence blade; 143—toothed ring; 144—rotating impeller; 145—first gear; 146—second gear; 147—connection pipe; 2—liquid storage apparatus; 3—liquid suction assembly; 31—slide cylinder; 32—slide rod; 33—liquid suction pipe; 331—water pump; 332—liquid inlet; 4—dust removal assembly; 41—first transmission shaft; 42—second transmission shaft; 43—dust removal fabric; 431—flexible protrusion; 44—wiping roller; 45—transmission member; 46—drive motor.

DETAIL DESCRIPTION OF THE DISCLOSURE

The following is a further description of the present disclosure by means of embodiments, but the present disclosure is not limited to those embodiments.

The treatment device of the present disclosure comprises a spray apparatus. It can also comprise one or more of the group consisting of a liquid storage apparatus, a liquid suction assembly, and a dust removal assembly.

<Spray Apparatus>

The spray apparatus has an exhaust gas inlet. The exhaust gas inlet can be arranged on the side wall of the spray apparatus, and preferably, it is arranged on a lower part of the side wall. The exhaust gas inlet allows an exhaust gas to be treated to enter the spray apparatus.

The spray apparatus has an exhaust gas outlet. The exhaust gas outlet can be arranged on the top of the spray apparatus. The exhaust gas outlet allows the exhaust gas that has come into contact with a spray liquid to go out of the spray apparatus.

The spray apparatus has a spray liquid outlet. The spray liquid outlet can be arranged on the bottom of the spray apparatus. The spray liquid outlet discharges the spray liquid that has come into contact with the exhaust gas from the spray apparatus.

A sprayer is arranged in the spray apparatus. The sprayer comprises an input pipe, a nozzle, a toothed ring, a rotating impeller, a first gear, and a second gear.

The input pipe is configured to be able to input the spray liquid to the nozzle. The input pipe can assume a ring shape. The inner side of the input pipe can communicate with a connection pipe. The connection pipe can be rotatably connected to the nozzle. The connection pipe can be more than one. The number of the connection pipe can be the same as that of the nozzle. The multiple connection pipes can be evenly distributed over the inside of the input pipe.

The nozzle is rotatably connected to the input pipe, and preferably, it is rotatably connected to the input pipe by the connection pipe. The nozzle is configured to be able to spray the spray liquid into the spray apparatus. The nozzle can have a liquid outlet opened downwards. The nozzle can be more than one. These nozzles are arranged in a ring shape.

A turbulence blade is attached to the outer surface of the nozzle. Each of the nozzles is connected to at least two turbulence blades. These turbulence blades can be evenly distributed on the outer surface of the nozzle. These multiple turbulence blades can be divided into groups, and each group comprises two turbulence blades that are arranged such that they face each other. Preferably, the two turbulence blades in either group are arranged in a "八" shape.

A first gear is connected to the periphery of the nozzle. The first gear can be more than one. The number of the first gears can be the same as that of the nozzles.

A toothed ring is provided below the input pipe and arranged on the ring-shaped periphery formed by the nozzles. The inner side of the toothed ring is provided with inner-ring teeth. The inner-ring teeth mesh with the first gear. During the rotation of the toothed ring, the inner-ring teeth drive each of the first gears to rotate, thereby causing the nozzle to rotate. Meshing teeth are provided on a surface of the toothed ring that is away from the input pipe. The meshing teeth mesh with a second gear.

A rotating impeller is provided below the toothed ring. The rotating impeller is arranged above the exhaust gas inlet. The rotating impeller can be arranged near the exhaust gas inlet. The rotating impeller can be connected to the spray apparatus by a connection shaft. A rising hot exhaust gas pushes the rotating impeller to rotate, and the rotating impeller drives the second gear to rotate.

The second gear is connected to the rotating impeller. The second gear can be connected to the rotating impeller by a connection shaft. The second gear meshes with the meshing teeth. The second gear drives the toothed ring to rotate.

<Liquid Storage Apparatus>

A liquid storage apparatus is provided below the spray apparatus. The liquid storage apparatus is configured to be able to store the spray liquid. The liquid storage apparatus has an opening on its top. The spray liquid enters the liquid storage apparatus by the opening on the top.

The liquid storage apparatus comprises has a first side wall, a second side wall, and a bottom surface. The first and second side walls face each other.

<Liquid Suction Assembly>

The liquid suction assembly comprises a slide cylinder, a slide rod, and a liquid suction pipe.

The slide cylinder is fixed in the liquid storage apparatus. Specifically, the slide cylinder can be connected to the inner wall of the liquid storage apparatus. The slide cylinder is filled with a thermally expandable material. The thermally expandable material can control, by a volume change thereof, stretching out and drawing back of the slide rod.

The slide rod is slidingly connected to the slide cylinder.

One end of the liquid suction pipe is connected to the input pipe. The other end of the liquid suction pipe is provided with a liquid inlet. The end of the liquid suction pipe that is provided with the liquid inlet is connected to the slide rod. At least a part of the liquid suction pipe is made of a flexible material. The liquid suction pipe is configured to be able to deliver the spray liquid to the input pipe. A water pump can be provided on the liquid suction pipe. According to one embodiment of the present disclosure, a part of the liquid suction pipe that has the liquid inlet is made of a rigid material. A part of the liquid suction pipe that is between the liquid inlet and the water pump is made of a flexible material. A part of the liquid suction pipe that is between the water pump and the input pipe is made of a rigid material.

<Dust Removal Assembly>

The dust removal assembly comprises a first transmission shaft, a second transmission shaft, and a dust removal fabric. In some embodiments, the dust removal assembly can further comprise a wiping roller and a drive motor.

The first transmission shaft is arranged above an edge A of the opening of the liquid storage apparatus. The second transmission shaft is arranged above an edge B of the opening of the liquid storage apparatus. The edges A and B are arranged to face each other. According to one embodiment of the present disclosure, the first transmission shaft is arranged above an upper edge of the first side wall. The second transmission shaft is arranged above an upper edge of the second side wall. The first transmission shaft and the second transmission shaft are configured to be able to support the dust removal fabric and drive the dust removal fabric to move.

The dust removal fabric comprises a first part, a second part, a third part, and a fourth part that are connected in sequence. The first part covers at least a part of the first transmission shaft. The second part covers at least a part of an inner surface of a side wall of the liquid storage apparatus that is close to the first transmission shaft, at least a part of an inner surface of the bottom of the liquid storage apparatus, and at least a part of an inner surface of a side wall of the liquid storage apparatus that is close to the second transmission shaft. The third part covers at least a part of the second transmission shaft. The fourth part covers at least a part of an outer surface of a side wall of the liquid storage apparatus that is close to the first transmission shaft, at least a part of an outer surface of the bottom of the liquid storage apparatus, and at least a part of an outer surface of a side wall of the liquid storage apparatus that is close to the second transmission shaft. A side wall of the liquid storage apparatus that is close to the first transmission shaft can be the first side wall. A side wall of the liquid storage apparatus that is close to the second transmission shaft can be the second side wall.

A flexible protrusion can be provided on a surface of the dust removal fabric that is away from the liquid storage apparatus. The flexible protrusion is configured to be able to intercept dust in the spray liquid. The flexible protrusion can be more than one. The multiple flexible protrusions can be equally spaced.

The outer wall of the first transmission shaft can be provided with a first sprocket. The outer wall of the second transmission shaft can be provided with a second sprocket. A surface of the dust removal fabric that is close to the liquid storage apparatus can be provided with a chain that matches the first sprocket and the second sprocket. That helps the first transmission shaft and the second transmission shaft to convey the dust removal fabric more smoothly.

The wiping roller is arranged on the bottom of the liquid storage apparatus and comes in contact with a surface of the dust removal fabric that is away from the liquid storage apparatus. The wiping roller is configured to be able to remove dust on the dust removal fabric.

The drive motor is connected to the first transmission shaft. According to one embodiment of the present disclosure, the shaft end of the drive motor is connected to the first transmission shaft. The drive motor can drive the first transmission shaft to move.

The drive motor is connected to the wiping roller by a transmission member. The drive motor can drive the wiping roller to move. Specifically, the shaft end of the drive motor is provided with a first pulley. The wiping roller is connected to a second pulley. One end of a belt is wrapped around the periphery of the first pulley, and the other end of the belt is wrapped around the periphery of the second pulley.

The dust removal assembly of the present disclosure can further comprise a second drive motor. The second drive motor is connected to the second transmission shaft. The second drive motor is configured to be able to drive the second transmission shaft to move.

Example 1

Figure 1:
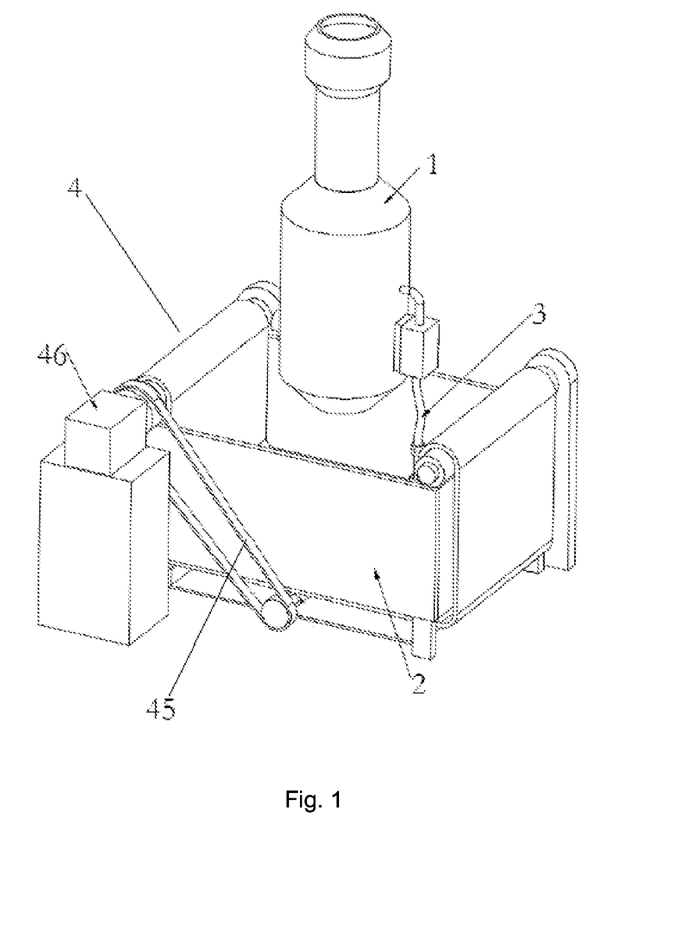
FIG. 1 is a structure diagram of a treatment device for an exhaust gas from rare earth calcination according to the present disclosure.

As shown in FIG. 1, the treatment device for an exhaust gas from rare earth calcination of the present disclosure comprises a spray apparatus 1, a liquid storage apparatus 2, a liquid suction assembly 3, and a dust removal assembly 4.

The lower part of the side wall of the spray apparatus 1 is provided with an exhaust gas inlet 11. The exhaust gas inlet 11 allows an exhaust gas to be treated to enter the spray apparatus 1.

The top of the spray apparatus 1 is provided with an exhaust gas outlet 12. The exhaust gas outlet 12 discharges the exhaust gas that has come into contact with the spray liquid from the spray apparatus 1.

The bottom of the spray apparatus 1 is provided with a spray liquid outlet 13. The spray liquid outlet 13 discharges the spray liquid that has come into contact with the exhaust gas from the spray apparatus 1.

Figure 3:
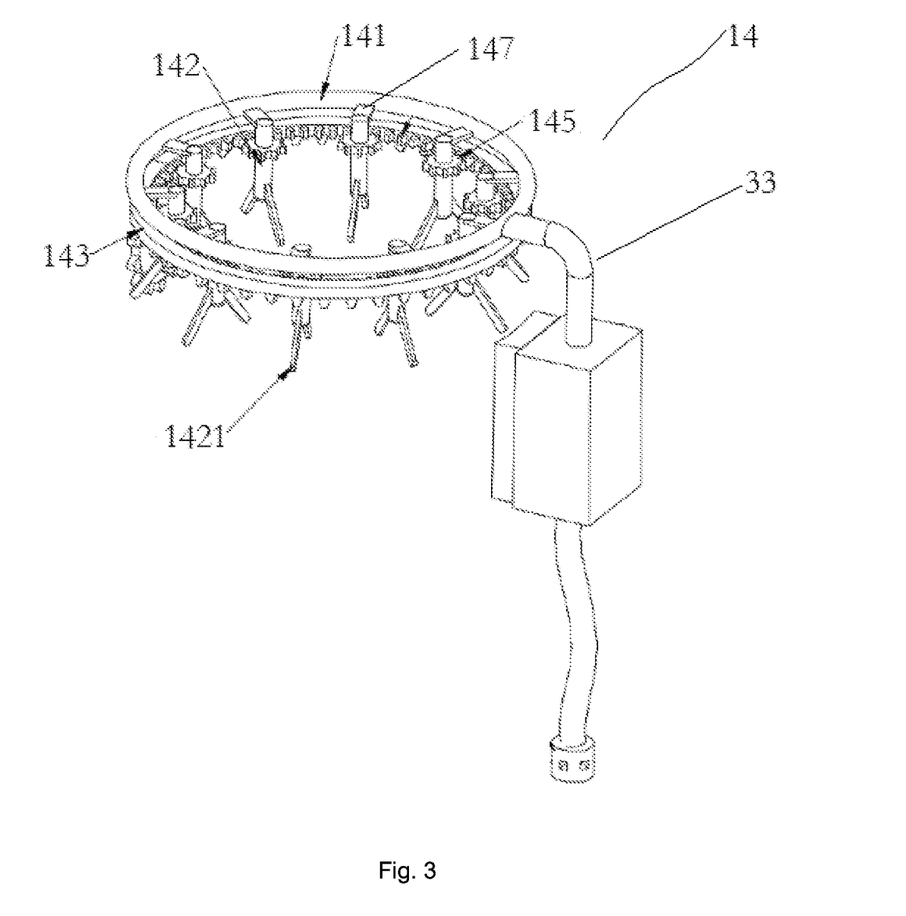
FIG. 3 is a structure diagram of the sprayer and the liquid suction assembly of the treatment device shown in FIG. 1.
Figure 4:
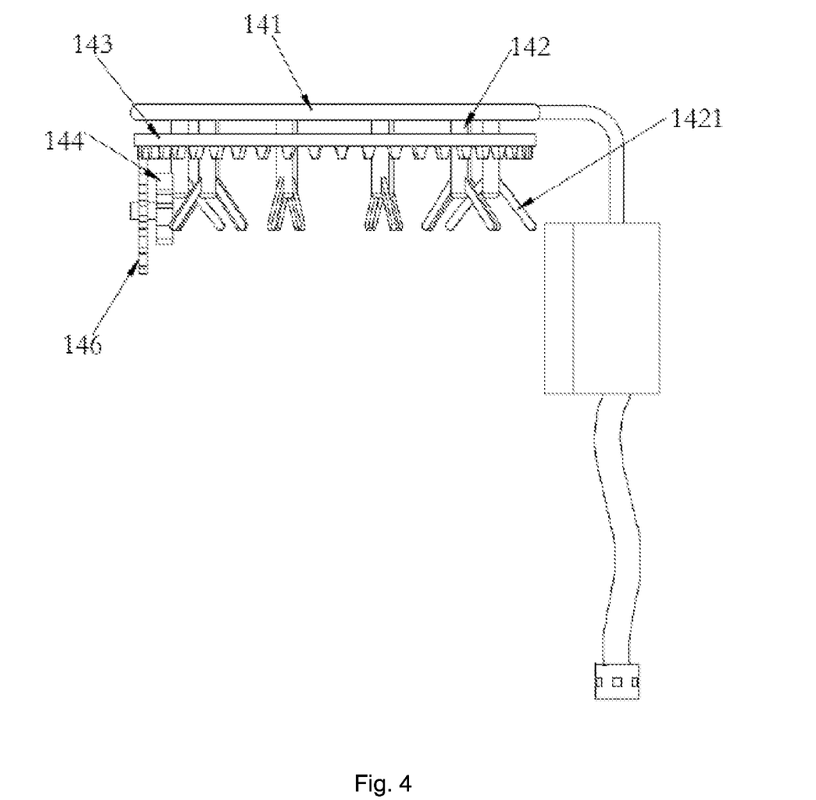
FIG. 4 is a side view of the structure shown in FIG. 3.

A sprayer 14 is provided inside the spray apparatus 1. As shown in FIGS. 3 and 4, the sprayer 14 comprises an input pipe 141, a nozzle 142, a toothed ring 143, a rotating impeller 144, a first gear 145, and a second gear 146.

The input pipe 141 is annular. The input pipe 141 inputs the spray liquid to the nozzle 142. A plurality of connection pipes 147 are evenly distributed over the inside of the input pipe 141.

The nozzle 142 is more than one. The nozzle 142 is rotatably connected to the connection pipe 147. The nozzle 142 has a liquid outlet opened downwards. The multiple nozzles 142 are arranged in a ring shape. The nozzle 142 sprays the spray liquid into the spray apparatus 1. An end part of the nozzle 142 that is close to the liquid outlet is provided with a turbulence blade 1421. Each of the nozzles 142 can be provided with two turbulence blades 1421 that face each other. The two turbulent blades 1421 are arranged in a " 八 " shape.

The first gear 145 is more than one. The first gear 145 is connected to the periphery of the nozzle 142. The number of the first gear 145 can be the same as that of nozzle 142.

The toothed ring 143 is provided below the input pipe 141 and arranged on a periphery of a ring formed by the nozzles 142. The inner side of the toothed ring 143 is provided with inner-ring teeth. The inner-ring teeth mesh with the first gear 145. During the rotation of the toothed ring 143, the inner-ring teeth drive each of the first gears 145 to rotate, thereby causing the nozzle 142 to rotate. Meshing teeth are provided on a surface of the toothed ring 143 that is away from the input pipe 141.

The rotating impeller 144 is provided below the toothed ring 143 and arranged above the exhaust gas inlet 11. The rotating impeller 144 is arranged near the exhaust gas inlet 11. The rotating impeller 144 is connected to the inner wall of the spray apparatus 1 by a connection shaft. The rotating impeller 144 drives the second gear 146 to rotate.

The second gear 146 is connected to the rotating impeller 144 by a connection shaft. The second gear 146 meshes with the meshing teeth. The second gear 146 drives the toothed ring 143 to rotate.

The spray apparatus 1 can be a spray tower.

The liquid storage apparatus 2 is provided below the spray apparatus 1. The liquid storage apparatus 2 stores the spray liquid. The liquid storage apparatus 2 has an opening on its top. The spray liquid enters the liquid storage apparatus 2 by the opening. The liquid storage apparatus 2 comprises a first side wall, a second side wall, and a bottom surface. The first and second side walls face each other.

The liquid suction assembly 3 delivers the spray liquid in the liquid storage apparatus 2 to the sprayer 14. The liquid suction assembly 3 comprises a slide cylinder 31, a slide rod 32, and a liquid suction pipe 33.

The slide cylinder 31 is arranged in the liquid storage apparatus 2 and connected to the inner wall of the liquid storage apparatus 2. The slide cylinder 31 is filled with a thermally expandable material.

The slide rod 32 is slidingly connected to the inner wall of the slide cylinder 31. The stretching out and drawing back of the slide rod 32 can be controlled by a volume change of the thermally expandable material.

One end of the liquid suction pipe 33 is provided with a liquid inlet 332. The end of the liquid suction pipe 33 that is provided with the liquid inlet is connected to the slide rod 32. The other end of the liquid suction pipe 33 is connected to the input pipe 141. A water pump 331 can be provided on the liquid suction pipe 33. A part of the liquid suction pipe 33 that has the liquid inlet is made of a rigid material. A part of the liquid suction pipe 33 that is between the liquid inlet and the water pump is made of a flexible material. A part of the liquid suction pipe 33 that is between the water pump and the input pipe 141 is made of a rigid material.

Figure 2:
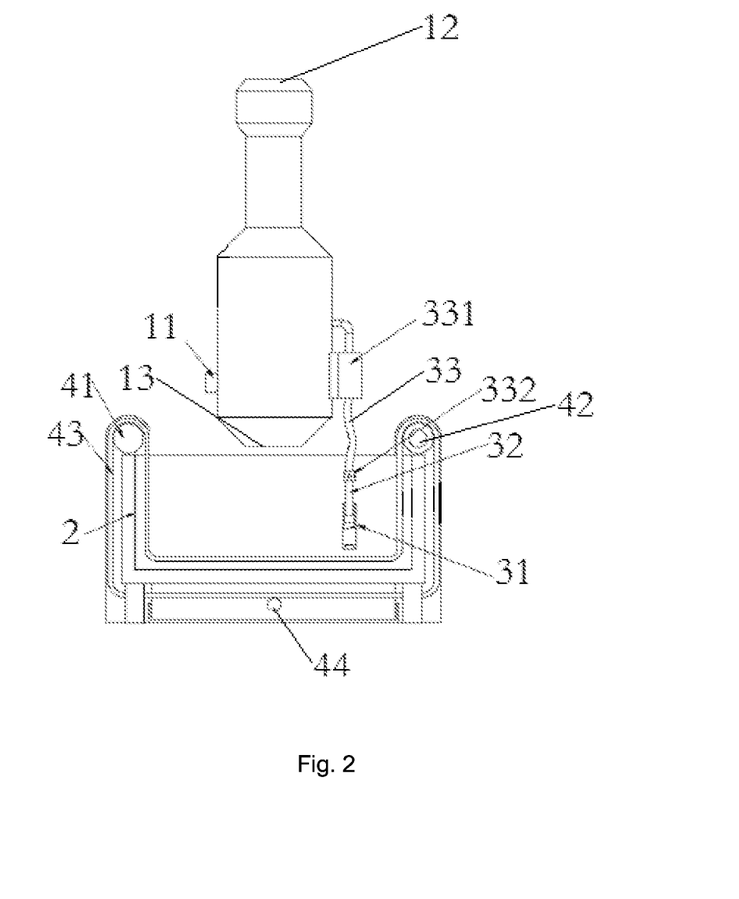
FIG. 2 is a structure diagram of a part of the treatment device shown in FIG. 1.

As shown in FIGS. 1 and 2, the dust removal assembly 4 comprises a first transmission shaft 41, a second transmission shaft 42, a dust removal fabric 43, a wiping roller 44, a transmission member 45, and a drive motor 46.

The first transmission shaft 41 is arranged above an upper edge of the first side wall. The second transmission shaft 42 is arranged above an upper edge of the second side wall. The first transmission shaft 41 and the second transmission shaft 42 support the dust removal fabric 43 and drive the dust removal fabric 43 to move.

The dust removal fabric 43 comprises a first part, a second part, a third part, and a fourth part that are connected in sequence. The first part covers at least a part of the first transmission shaft 41. The second part covers at least a part of the inner surface of the first side wall, at least a part of the inner surface of the bottom, and at least a part of the inner surface of the second side wall. The third part covers at least a part of the second transmission shaft 42. The fourth part covers at least a part of the outer surface of the first side wall, at least a part of the outer surface of the bottom, and at least a part of the outer surface of the second side wall. The dust removal fabric 43 removes dust in the spray liquid in the liquid storage apparatus 2.

The wiping roller 44 is arranged on the bottom of the liquid storage apparatus 2 and comes into contact with a surface of the dust removal fabric 43 that is away from the liquid storage apparatus 2. The wiping roller 44 removes dust on the dust removal fabric 43.

The transmission member 45 comprises a first pulley, a belt, and a second pulley.

The shaft end of the drive motor 46 is connected to the first transmission shaft 41 so as to drive the first transmission shaft 41 to move.

The shaft end of the drive motor 46 is provided with the first pulley. The wiping roller 44 is connected to the second pulley. One end of the belt is wrapped around the periphery of the first pulley, and the other end of the belt is wrapped around the periphery of the second pulley. The drive motor 46 drives the wiping roller 44 to rotate by the transmission member 45.

Example 2

The treatment device in this example is the same as the one in Example 1 except the structure described below.

Figure 5:
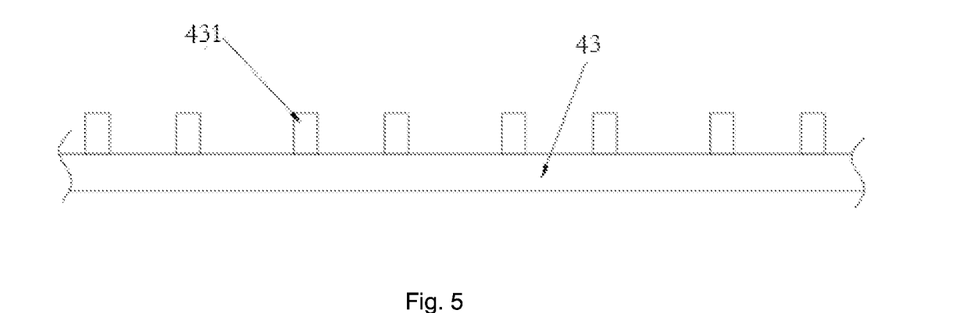
FIG. 5 is a structure diagram of a part of the dust removal fabric.

As shown in FIG. 5, a surface of the dust removal fabric 43 that is away from the liquid storage apparatus 2 is provided with flexible protrusions 431 that are equally spaced. The flexible protrusions 431 intercept dust in the spray liquid.

Example 3

The treatment device in this example is the same as the one in Example 2 except the structure described below.

The outer wall of the first transmission shaft 41 is provided with a first sprocket. The outer wall of the second transmission shaft 42 is provided with a second sprocket.

A surface of the dust removal fabric 43 that is close to the liquid storage apparatus 2 is provided with a chain that matches the first sprocket and the second sprocket.

During the use of the treatment device, an exhaust gas to be treated enters the spray apparatus 1 from the exhaust gas inlet 11. The rising exhaust gas pushes the rotating impeller 144 to rotate, and the rotating impeller 144 drives the second gear 146 to rotate by the connection shaft. The second gear 146 meshes with the meshing teeth on the toothed ring 143 to drive the toothed ring 143 to rotate. The toothed ring 143 drives the first gear 145 to rotate by the inner-ring teeth, thereby causing the nozzle 142 to rotate. In this way, the spray liquid can be sprayed more uniformly, thereby causing the spray liquid to be mixed with the exhaust gas more uniformly.

The rotation of the nozzle 142 enables the turbulence blade 1421 on the nozzle 142 to rotate. The turbulence blade 1421 can make the exhaust gas be distributed more evenly, thereby causing the spray liquid to be mixed with the exhaust gas more uniformly.

The spray liquid discharged from the spray liquid outlet 13 drops into the liquid storage apparatus 2. The discharged spray liquid contains a certain amount of dust, which increases the amount of dust in the liquid storage apparatus 2. Besides, the discharged spray liquid has absorbed the heat of the exhaust gas, which increases the temperature of the spray liquid in the liquid storage apparatus 2. Thus, the amount of dust in the liquid storage apparatus 2 is directly proportional to the temperature of the spray liquid in the liquid storage apparatus 2. As a result of an increase in the temperature of the spray liquid in the liquid storage apparatus 2, the thermally expandable material in the slide cylinder 31 expands, and pushes the slide rod 32 to move upward, and enables the liquid inlet of the liquid suction pipe 33 to move upward—which causes the part of the liquid suction pipe 33 that is made of a flexible material to draw back. In this way, the spray liquid in the liquid storage apparatus 2 that is at a higher liquid level and contains less dust enters the liquid suction pipe 33, and thus the apparatus is less likely to be clogged.

The dust removal fabric 43 adsorbs dust in the spray liquid in the liquid storage apparatus 2. The dust removal fabric 43 that has adsorbed dust is moved out of the liquid storage apparatus 2 by the first transmission shaft 41 and the second transmission shaft 42. The wiping roller 44 removes dust on the dust removal fabric 43. The dust removal fabric 43 that has got the dust removed, driven by the first transmission shaft 41 and the second transmission shaft 42, enters the liquid storage apparatus 2 again to adsorb dust in the spray liquid.

The present disclosure is not limited to the embodiments described above. Any variation, improvement, and replacement which do not depart from the essence of the present disclosure and which those skilled in the art are able to think of fall within the scope of the present disclosure.

What is claimed is:

1. A treatment device for an exhaust gas from rare earth calcination, comprising a spray apparatus in which a sprayer is arranged;
   the sprayer comprising an input pipe, a nozzle, a toothed ring, a rotating impeller, a first gear, and a second gear;
   wherein the input pipe is configured to input a spray liquid to the nozzle;
   wherein the nozzle is arranged to be more than one, rotatably connected to the input pipe, arranged in a ring shape, and configured to be able to spray the spray liquid into the spray apparatus;
   wherein the first gear is connected to a periphery of the nozzle;
   wherein the toothed ring is arranged below the input pipe and arranged on a periphery of a ring formed by the nozzles; inner-ring teeth that mesh with the first gear are provided on an inner side of the toothed ring; and meshing teeth are provided on a surface of the toothed ring that is away from the input pipe;
   wherein the rotating impeller is arranged below the toothed ring and configured to drive the second gear to rotate; and
   wherein the second gear is connected to the rotating impeller, meshes with the meshing teeth, and is configured to drive the toothed ring to rotate.

2. The treatment device according to claim 1, wherein a turbulence blade is attached to an outer surface of the nozzle.

3. The treatment device according to claim 2, wherein the nozzle has a liquid outlet opened downwards, and that the turbulence blade is at least two, and the turbulence blades are dispersedly arranged near the liquid outlet.

4. The treatment device according to claim 1, wherein the treatment device further comprises a liquid suction assembly that comprises a slide cylinder, a slide rod, and a liquid suction pipe;
   wherein one end of the liquid suction pipe is connected to the input pipe, and the other end of the liquid suction pipe is provided with a liquid inlet; at least a part of the liquid suction pipe is made of a flexible material; and the liquid suction pipe is configured to be able to deliver the spray liquid to the input pipe;

wherein one end of the slide rod is connected to one end of the liquid suction pipe that is provided with the liquid inlet; and wherein the slide cylinder is filled with a thermally expandable material, the slide cylinder is connected to one end of the slide rod that is away from the liquid suction pipe, and the thermally expandable material is configured to be able to control, by a volume change thereof, stretching out and drawing back of the slide rod.

5. The treatment device according to claim 4, wherein the liquid suction pipe is provided with a water pump.

6. The treatment device according to claim 1, wherein a lower part of the spray apparatus is provided with an exhaust gas inlet that is configured to enable the exhaust gas to be treated to enter the spray apparatus;

wherein a top part of the spray apparatus is provided with an exhaust gas outlet that is configured to enable the exhaust gas that has come into contact with the spray liquid to be discharged from the spray apparatus; and wherein a bottom part of the spray apparatus is provided with a spray liquid outlet that is configured to enable the spray liquid that has come into contact with the exhaust gas to be discharged from the spray apparatus.

7. The treatment device according to claim 4, wherein the treatment device further comprises a liquid storage apparatus;

wherein the liquid storage apparatus is arranged below the spray apparatus and the liquid storage apparatus is provided with an opening on its top, the slide cylinder is fixed in the liquid storage apparatus, and the liquid storage apparatus is configured to be able to store the spray liquid.

8. The treatment device according to claim 7, wherein the treatment device further comprises a dust removal assembly that comprises a first transmission shaft, a second transmission shaft, and a dust removal fabric;

wherein the first transmission shaft is arranged above an edge A of the opening of the liquid storage apparatus;

wherein the second transmission shaft is arranged above an edge B of the opening of the liquid storage apparatus, the edge A and the edge B facing each other;

wherein the first transmission shaft and the second transmission shaft are configured to be able to support the dust removal fabric and drive the dust removal fabric to move;

wherein the dust removal fabric comprises a first part, a second part, a third part, and a fourth part that are sequentially connected;

the first part covering at least a part of the first transmission shaft;

the second part covering at least a part of an inner surface of a side wall of the liquid storage apparatus that is close to the first transmission shaft, at least a part of an inner surface of the bottom of the liquid storage apparatus, and at least a part of an inner surface of a side wall of the liquid storage apparatus that is close to the second transmission shaft;

the third part covering at least a part of the second transmission shaft; and the fourth part covering at least a part of an outer surface of a side wall of the liquid storage apparatus that is close to the first transmission shaft, at least a part of an outer surface of the bottom of the liquid storage apparatus, and at least a part of an outer surface of a side wall of the liquid storage apparatus that is close to the second transmission shaft; and wherein the dust removal fabric is configured to be able to remove dust in the spray liquid in the liquid storage apparatus.

9. The treatment device according to claim 8, wherein the dust removal assembly further comprises a wiping roller and a drive motor, wherein the wiping roller is arranged on the bottom of the liquid storage apparatus and comes into contact with a surface of the dust removal fabric that is away from the liquid storage apparatus, and the wiping roller is configured to be able to remove dust on the dust removal fabric; and wherein the drive motor is connected to the first transmission shaft, and connected to the wiping roller by means of a transmission member.

10. The treatment device according to claim 8, wherein a surface of the dust removal fabric that is away from the liquid storage apparatus is provided with a flexible protrusion that is configured to be able to intercept dust in the spray liquid.

* * * * *